K. G. GYLLSTROM.
INSECT CAPTURING APPARATUS.
APPLICATION FILED NOV. 17, 1914.

1,144,358.

Patented June 29, 1915.

WITNESSES:
S. M. Baeder
K. G. LeArd

INVENTOR
Knut George Gyllstrom
BY
Ivan E. A. Konigsberg
ATTORNEY

UNITED STATES PATENT OFFICE.

KNUT GEORGE GYLLSTROM, OF RICHMOND HILL, NEW YORK.

INSECT-CAPTURING APPARATUS.

1,144,358.                    Specification of Letters Patent.    Patented June 29, 1915.

Application filed November 17, 1914. Serial No. 872,515.

*To all whom it may concern:*

Be it known that I, KNUT GEORGE GYLLSTROM, a citizen of the United States of America, and a resident of Richmond Hill, Queens county, New York, have invented certain new and useful Improvements in Insect-Capturing Apparatus, of which the following is a specification.

This invention relates to improvements in apparatus for capturing insects.

The main object of the invention is to provide an apparatus for this purpose adapted to be used indoors wherever such an apparatus is desirable or necessary and with this object in view the apparatus is made portable.

Another object of the invention is to arrange the various parts of the apparatus in an attractive manner.

Other objects will appear as this specification proceeds while reference is had to the accompanying drawing in which—

Figure 1:
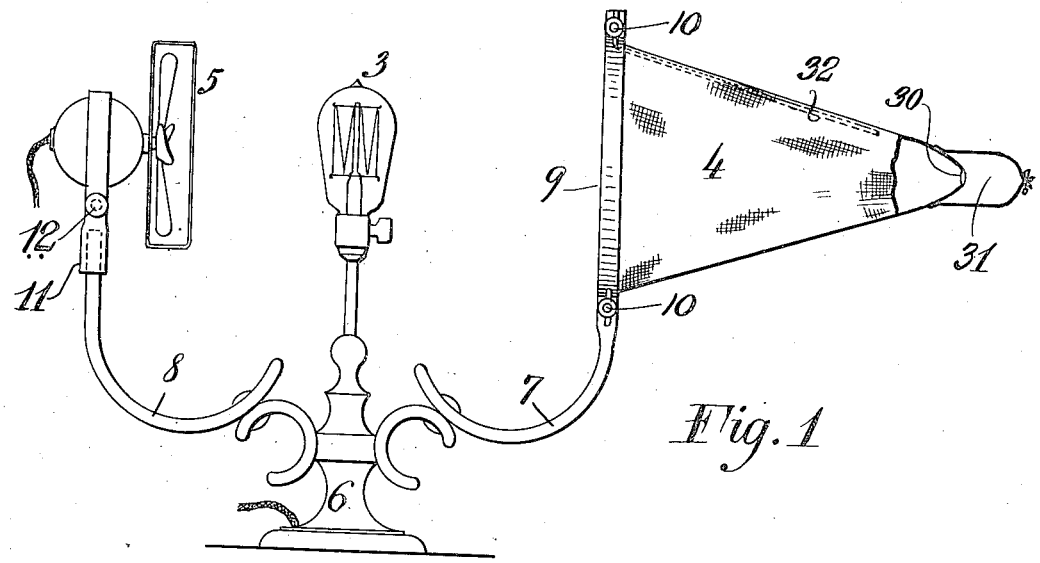
Figure 2:
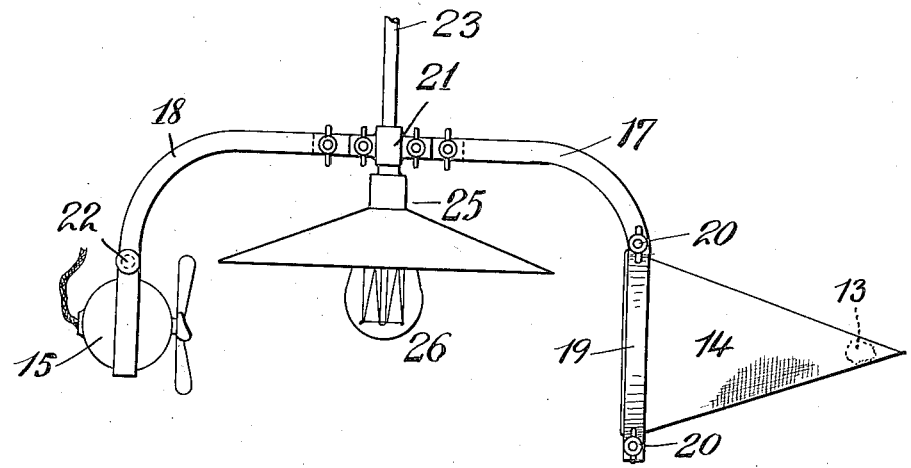

Figure 1 is a side view of an apparatus embodying the invention, and Fig. 2 shows a modification.

The apparatus comprises three main parts namely, a source of light 3 for attracting the insects, a bag or similar device 4 into which the insects are blown by a fan 5.

6 is a foot or base from which the bag 4 and fan 5 are supported by arms 7 and 8.

The arm 7 carries a ring shaped holder or bracket 9 in which the bag is suitably held by wing nuts 10, 10 so as to be readily removable for cleaning.

The fan 5 is provided with a socket 11 by means of which the fan is held on the arm 8 and whereby the fan may be turned on the arm so as to blow in other directions than toward the bag 4.

12 represents a friction joint of any well known construction for tilting the fan.

In operation, when the light 3 is turned on, the insects are attracted and swarm round it and are then blown by the air current from the fan into the bag 4. This latter is preferably made of gauze, cheesecloth or other similar suitable material, which of course will be blown up as soon as the fan is started. Preferably the end of the bag is provided with a small hole 30 opening into a trap or compartment 31 into which the insects are gathered. By loosening the nuts 10 the bag may be removed and the insects disposed of. A wire rod 32 may be used inside the bag to prevent it from being blown about and making noise.

If desired there may be provided a small sponge or piece of cotton 13 saturated with a suitable liquid which by evaporation kills the insects.

Fig. 2 illustrates a device adapted to be secured to a depending light fixture 25 having the electric or gas lamp 26. In this instance the bag 14 is secured by a circular holder 19 to the arm 17 and fixed by wing nuts 20. The motor 15 is secured by a friction joint 22 to the arm 18. The arms 17 and 18 are secured by wing nuts as shown or other securing or clamping means to a clamp 21 clamped to the stem 23 of the fixture 25 by any suitable means. The operation is in this instance the same as set forth above.

The constructions described possess several advantages in addition to the utility of the apparatus for capturing insects. The apparatus shown in Fig. 1 is well adapted for use in homes and other indoor places because of its portability and attractive appearance, and is also of particular value in that during the summer months porch screens are unnecessary where this apparatus is used. The fact that the fan may be turned on the end of the arm 8 adds to the utility of the apparatus in that the fan may be used to blow in other direction than that of the bag 4, and of course the fan may be lifted off altogether and used in other places.

In Fig. 2 it will be seen that the arms 17 and 18 may be adjusted with relation to the fixture 25 so as to bring the fan and bag into proper position with relation to the lamp 26.

The details of construction may be changed from those shown in the drawing and I claim all such changes as come within the principles of invention and the scope of the appended claim.

I claim:

An apparatus for capturing insects comprising in combination portable supporting means, a light mounted centrally on the same, a fan detachably mounted on the said supporting means to the one side of the said light, a ring formed bracket mounted on the said supporting means on the opposite side of said light, a bag detachably secured in said bracket, a rigid member supported within the bag to maintain the latter in alinement with the said light and the said fan and an insect trap secured to the said bag.

Signed at New York, N. Y. this 5th day of Nov. 1914.

KNUT GEORGE GYLLSTROM.

Witnesses:
IVAN KONIGSBERG,
K. G. LE ARD.